Patented July 23, 1946

2,404,680

UNITED STATES PATENT OFFICE 2,404,680

PRINTING INK

Carl W. Aneshansel, Cincinnati, Ohio, assignor to Sterling Drug Inc., New York, N. Y., a corporation of Delaware No Drawing. Application March 26, 1945, Serial No. 585,022

7 Claims. (Cl. 106—30)

This invention relates to printing inks, and has particular reference to that form of printing ink which is set after printing by the application of moisture to the print to precipitate the binder from the hygroscopic solvent.

Heretofore, such moisture-setting printing inks usually contained ethylene or diethylene glycol as the hygroscopic solvent from which the vehicle was made by dissolving a natural or synthetic water-insoluble resin binder therein, but because such solvents have low moisture tolerance during periods of high press-room humidity, they were unstable, thus necessitating the addition or use of materials increasing the moisture tolerance of the ink, in the effort to attain the relatively fine balance between atmospheric humidity tolerance and intended moisture absorption when setting was desired after printing. For example, a small amount of triethanolamine or its equivalent has been added to a moisture-setting ink vehicle consisting of a solution of shellac in ethylene or diethylene glycol in order to make them commercially practicable, but this expedient and other similar expedients render the inks short in body so that they coagulate or "liver" upon standing and cannot be held in storage without deterioration.

Furthermore, the vehicles of commercial moisture-setting inks are not good dispersing agents without further modification, and are not resistant to animal and vegetable fats and greases, since the color bleeds, smudges and rubs off when the print is placed in contact therewith. Hence, such inks are not useful for imprinting wrappers for butter, lard, oleomargarine, meats, bread, sandwiches and other fat-containing foods, or other printed articles likely to come in contact with such foods, fats or greases.

In accordance with the present invention, a moisture-setting printing ink is provided, which has sufficient moisture tolerance to be stable on the press under high press-room humidity conditions, without requiring the addition of stabilizer; which nevertheless dries quickly when printed in a thin film, either under natural drying conditions or upon application of moisture by moist air or steam; which will stand in storage indefinitely and retain its original printing body without coagulation or "livering"; which is fat- or grease-proof and hence does not bleed, smudge or rub off when placed in contact with animal or vegetable fat-containing foods, and whose vehicle is a good dispersing agent for all pigments without requiring modification for that purpose.

The moisture-setting printing ink of this invention comprises a pigment or dye dispersed in a vehicle or varnish consisting of about 25 to about 50% by weight of shellac dissolved in about 50 to 75% polypropylene glycol by weight. The shellac may be of any standard commercial natural or synthetic grade, the most satisfactory results having been obtained with refined natural shellac. The polypropylene glycol has a relatively high boiling point at normal pressure, so as not to evaporate on the press under printing conditions, the boiling point range being between about 230° C. and about 300° C. The suitable class of polypropylene glycols comprises those which are liquid or flow at normal temperatures, but excludes those of such high molecular weight as to be solid or wax-like at normal temperatures.

These normally liquid or flowable polypropylene glycols have been found to be sufficiently moisture-tolerant to be stable in a printing ink, even at high humidity conditions in the press room, such as during midsummer, but are nevertheless highly hygroscopic in the presence of excess moisture when spread in a thin print film on the order of a few microns thick. The moisture may be applied to the imprinted paper or other freshly-printed surface by directing moist air or steam thereon, or otherwise applying moisture thereto, so as to render the shellac binder no longer soluble in the polypropylene glycol, thus causing the ink binder and its entrained coloring matter to precipitate rapidly and thus set the ink.

The following examples are illustrative of the varnish and ink compositions of this invention:

*Example No. 1.—Varnish*

| | Parts by weight |
|---|---|
| Shellac, refined | 40 |
| Polypropylene glycol | 60 |

*Example No. 2.—Red ink*

| | Parts by weight |
|---|---|
| Lithol Red toner | 24 |
| Varnish Example No. 1 | 76 |

*Example No. 3.—Yellow ink*

| | Parts by weight |
|---|---|
| Chrome Yellow | 60 |
| Varnish Example No. 1 | 40 |

*Example No. 4.—Black ink*

| | Parts by weight |
|---|---|
| Carbon Black | 20 |
| Varnish Example No. 1 | 80 |

Other formulations of water-insoluble pigment or dyes of the desired colors may be made, the proportions varying in accordance with the color desired, the ink in any case having the consistency required by the printing process; press, paper or other printing surface to be used.

Although certain preferred embodiments of the invention have been illustrated and described herein, it is to be understood that the invention is not limited thereby, but is susceptible to changes in form and detail within the scope of the appended claims.

I claim:

1. A moisture-setting printing ink, comprising water-insoluble coloring matter dispersed in a varnish consisting of a solution of about 25% to about 50% by weight of shellac in polypropylene glycol of the class which is substantially liquid at normal temperature.

2. A moisture-setting printing ink, comprising an insoluble pigment dispersed in a varnish consisting of a solution of about 25 to about 50% by weight of natural shellaac in about 50 to about 75% by weight of polypropylene glycol boiling between about 230 and about 300° C. at normal pressure.

3. A varnish vehicle for moisture-setting printing ink, consisting of about 25 to about 50% shellac by weight dissolved in about 50 to about 75% by weight of polypropylene glycol of the class which is substantially liquid at normal temperature.

4. A moisture-setting prining ink, comprising a water-soluble pigment dispersed in a varnish consisting of a solution of about 25% to about 50% by weight of synthetic shellac in about 50% to about 75% by weight of polypropylene glycol boiling between about 230 and about 300° C, at normal pressure.

5. A moisture-setting printing ink, comprising a water-insoluble pigment dispersed in a varnish consisting of a solution of about 25% to about 50% by weight of refined natural shellac in about 50% to about 75% by weight of polypropylene glycol boiling between about 230° and about 300° C. at normal pressure.

6. A varnish vehicle for moisture-setting printing ink, consisting of about 25% to about 50% synthetic shellac by weight dissolved in about 50% to about 75% by weight of propylene glycol of the class which is substantially liquid at normal temperature.

7. A varnish vehicle for moisture setting printing ink, consisting of about 25% to about 50% refined natural shellac by weight dissolved in about 50% to about 75% by weight of polypropylene glycol of the class which is substantially liquid at normal temperature.

CARL W. ANESHANSEL.

Certificate of Correction

Patent No. 2,404,680.　　　　　　　　　　　　　　　　　　　　　　　　July 23, 1946.

CARL W. ANESHANSEL

It is hereby certified that errors appear in the printed specification of the above numbered patent requiring correction as follows: Column 2, lines 5 and 6, for "natular" read *natural*; column 3, line 21, claim 2, for "shellaac" read *shellac*; column 4, line 1, claim 4, for "prining" read *printing*; line 2, same claim, for "water-soluble" read *water-insoluble*; and that the said Letters Patent should be read with these corrections therein that the same may conform to the record of the case in the Patent Office.

Signed and sealed this 8th day of October, A. D. 1946.

[SEAL]

LESLIE FRAZER,
*First Assistant Commissioner of Patents.* portions varying in accordance with the color desired, the ink in any case having the consistency required by the printing process; press, paper or other printing surface to be used.

Although certain preferred embodiments of the invention have been illustrated and described herein, it is to be understood that the invention is not limited thereby, but is susceptible to changes in form and detail within the scope of the appended claims.

I claim:

1. A moisture-setting printing ink, comprising water-insoluble coloring matter dispersed in a varnish consisting of a solution of about 25% to about 50% by weight of shellac in polypropylene glycol of the class which is substantially liquid at normal temperature.

2. A moisture-setting printing ink, comprising an insoluble pigment dispersed in a varnish consisting of a solution of about 25 to about 50% by weight of natural shellaac in about 50 to about 75% by weight of polypropylene glycol boiling between about 230 and about 300° C. at normal pressure.

3. A varnish vehicle for moisture-setting printing ink, consisting of about 25 to about 50% shellac by weight dissolved in about 50 to about 75% by weight of polypropylene glycol of the class which is substantially liquid at normal temperature.

4. A moisture-setting prining ink, comprising a water-soluble pigment dispersed in a varnish consisting of a solution of about 25% to about 50% by weight of synthetic shellac in about 50% to about 75% by weight of polypropylene glycol boiling between about 230 and about 300° C, at normal pressure.

5. A moisture-setting printing ink, comprising a water-insoluble pigment dispersed in a varnish consisting of a solution of about 25% to about 50% by weight of refined natural shellac in about 50% to about 75% by weight of polypropylene glycol boiling between about 230° and about 300° C. at normal pressure.

6. A varnish vehicle for moisture-setting printing ink, consisting of about 25% to about 50% synthetic shellac by weight dissolved in about 50% to about 75% by weight of propylene glycol of the class which is substantially liquid at normal temperature.

7. A varnish vehicle for moisture setting printing ink, consisting of about 25% to about 50% refined natural shellac by weight dissolved in about 50% to about 75% by weight of polypropylene glycol of the class which is substantially liquid at normal temperature.

CARL W. ANESHANSEL.

Certificate of Correction

Patent No. 2,404,680.     July 23, 1946.

CARL W. ANESHANSEL

It is hereby certified that errors appear in the printed specification of the above numbered patent requiring correction as follows: Column 2, lines 5 and 6, for "natular" read *natural*; column 3, line 21, claim 2, for "shellaac" read *shellac*; column 4, line 1, claim 4, for "prining" read *printing*; line 2, same claim, for "water-soluble" read *water-insoluble*; and that the said Letters Patent should be read with these corrections therein that the same may conform to the record of the case in the Patent Office.

Signed and sealed this 8th day of October, A. D. 1946.

[SEAL]

LESLIE FRAZER,
*First Assistant Commissioner of Patents.*